United States Patent
Tu et al.

(10) Patent No.: US 12,135,977 B2
(45) Date of Patent: *Nov. 5, 2024

(54) METHOD TO REALIZE SCANNER REDIRECTION BETWEEN A CLIENT AND AN AGENT USING DIFFERENT SCANNING PROTOCOLS

(71) Applicant: VMware LLC, Palo Alto, CA (US)

(72) Inventors: Zhongzheng Tu, Beijing (CN);
Weigang Huang, Beijing (CN);
Huiyong Huo, Beijing (CN);
Mingsheng Zang, Beijing (CN);
Yueting Zhang, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/897,866

(22) Filed: Aug. 29, 2022

(65) Prior Publication Data
US 2024/0020137 A1    Jan. 18, 2024

(30) Foreign Application Priority Data

Jul. 18, 2022    (WO) ................ PCT/CN2022/106196

(51) Int. Cl.
*H04N 1/32*       (2006.01)
*G06F 9/451*      (2018.01)
*H04N 1/00*       (2006.01)

(52) U.S. Cl.
CPC ......... *G06F 9/452* (2018.02); *H04N 1/00233* (2013.01); *H04N 1/32277* (2013.01); *H04N 1/3232* (2013.01)

(58) Field of Classification Search
CPC ................ G06F 9/452; H04N 1/00233; H04N 1/32277; H04N 1/3232
See application file for complete search history.

(56) References Cited

U.S. PATENT DOCUMENTS 7,012,706 B1 * 3/2006 Hansen .............. H04N 1/00241
358/1.15
9,489,471 B2   11/2016 Venkatesh
(Continued)

OTHER PUBLICATIONS

Notice of Allowance mailed Mar. 24, 2023 in U.S. Appl. No. 17/897,822, 14 pages.
(Continued)

*Primary Examiner* — Vivek Srivastava
*Assistant Examiner* — Wuji Chen
(74) *Attorney, Agent, or Firm* — Kim & Stewart LLP (57) ABSTRACT

A scanner redirection method includes the steps of: receiving from an application running on a host server, a request for scanner properties; acquiring properties of the physical scanner; converting the properties of the physical scanner that are described according to a first scanning protocol to properties of the physical scanner that are described according to a second scanning protocol; transmitting the properties of the physical scanner that are described according to the second scanning protocol to the application; in response to detecting a user selection made on an image of a user interface, transmitting the user selection to the application; and in response to the user selection, receiving from the application, a request for a scanned image, and transmitting a request to an image capture core to acquire the scanned image from the physical scanner.

18 Claims, 10 Drawing Sheets

(56) References Cited

U.S. PATENT DOCUMENTS

| | | | |
|---|---|---|---|
| 10,230,855 B1 | 3/2019 | Sarreo et al. | |
| 10,536,559 B2 | 1/2020 | Vajravel | |
| 11,716,428 B1 * | 8/2023 | Tu | H04N 1/00037 358/1.15 |
| 11,750,749 B1 * | 9/2023 | Tu | H04N 1/00018 358/1.13 |
| 2006/0023951 A1 * | 2/2006 | Tan | H04N 1/409 382/232 |
| 2006/0070090 A1 * | 3/2006 | Gulkis | H04N 1/00236 719/328 |
| 2007/0050616 A1 * | 3/2007 | Masui | H04N 1/324 713/152 |
| 2008/0137129 A1 * | 6/2008 | Ferlitsch | H04N 1/00877 358/1.15 |
| 2008/0239329 A1 * | 10/2008 | Kitada | H04N 1/00501 358/1.15 |
| 2009/0141931 A1 * | 6/2009 | Yadid-Pecht | H04N 1/32165 348/308 |
| 2009/0237728 A1 * | 9/2009 | Yamamoto | H04N 1/00204 358/1.15 |
| 2009/0284807 A1 * | 11/2009 | Niculescu | H04N 1/00206 358/474 |
| 2010/0079797 A1 * | 4/2010 | Ohara | H04N 1/32101 358/1.15 |
| 2010/0223340 A1 | 9/2010 | Pope et al. | |
| 2010/0296120 A1 * | 11/2010 | Hanano | H04N 1/00236 358/1.15 |
| 2010/0315675 A1 | 12/2010 | Yagi | |
| 2011/0013003 A1 * | 1/2011 | Thompson | G06V 40/161 348/E7.085 |
| 2011/0016475 A1 * | 1/2011 | Merna | H04N 1/33346 719/321 |
| 2011/0051190 A1 * | 3/2011 | Abe | H04N 1/00474 358/1.15 |
| 2011/0055765 A1 * | 3/2011 | Neubrand | H04N 1/32122 713/400 |
| 2012/0167208 A1 | 6/2012 | Buford et al. | |
| 2013/0054543 A1 * | 2/2013 | Brown | H03M 7/3084 707/693 |
| 2014/0118767 A1 * | 5/2014 | Kim | H04N 1/00225 358/1.13 |
| 2015/0055197 A1 * | 2/2015 | Romanoff | H04N 1/00225 358/494 |
| 2016/0006888 A1 | 1/2016 | Migishima et al. | |
| 2016/0006901 A1 | 1/2016 | Torigoshi et al. | |
| 2017/0289313 A1 | 10/2017 | Vajravel | |
| 2018/0082093 A1 * | 3/2018 | Crooks | G06F 11/3068 |
| 2018/0234517 A1 * | 8/2018 | Venkatesh | H04L 67/563 |
| 2019/0064510 A1 * | 2/2019 | Flohr | G06F 3/0346 |
| 2019/0394343 A1 * | 12/2019 | Sahara | H04N 1/00724 |
| 2020/0310704 A1 * | 10/2020 | Hanano | G06F 3/1204 |
| 2021/0141579 A1 | 5/2021 | Yuan et al. | |
| 2021/0227083 A1 * | 7/2021 | Shiraishi | H04N 1/00461 |
| 2021/0344780 A1 * | 11/2021 | Tomes | G06T 1/60 |
| 2024/0020137 A1 * | 1/2024 | Tu | H04N 1/32277 |
| 2024/0022670 A1 * | 1/2024 | Tu | H04N 1/0044 |

OTHER PUBLICATIONS

Non-Final Office Action mailed Apr. 17, 2023 in U.S. Appl. No. 17/897,780, 23 pages.

DYNAMSOFT "Document Scanner—Twain, Wia, Isis or Sane," Jan. 7, 2020, 8 pages, Retrieved from the Internet Aug. 28, 2022, URL: https://www.dynamsoft.com/blog/insights/document-scanning-twain-wia-isis-sane/.

Twain Resource Site—Home Page, 2022, 4 pages, Retrieved from the Internet Aug. 28, 2022, URL: https://twain.org/.

International Search Report and Written Opinion mailed May 16, 2023 in International Application No. PCT/US23/11293, 16 pages.

* cited by examiner

METHOD TO REALIZE SCANNER REDIRECTION BETWEEN A CLIENT AND AN AGENT USING DIFFERENT SCANNING PROTOCOLS

CROSS-REFERENCE

This application is based upon and claims the benefit of priority from International Patent Application No. PCT/CN2022/106196, filed on Jul. 18, 2022, the entire contents of which are incorporated herein by reference.

BACKGROUND

Many organizations rely on remote desktop services to provide lean, flexible computing environments. Remote desktop scanning is one important feature required by the end user of a remote desktop service. However, when the source of remote desktop scanning is a client-side scanner, processing of scan commands issued during remote sessions is inefficient and often results in crashes. A robust and efficient method to realize scanner redirection between a client computing device and a host server during a remote session is needed.

SUMMARY

Accordingly, one or more embodiments provide a scanner redirection method for a remote desktop system that includes a client computing device that has running therein a remote desktop client application including a scanner redirection module, and a host server, the scanner redirection module including a conversion module and an "image capture core" that is configured to communicate with a physical scanner. As used herein, "image capture core" is a service running in an operating system of the client computing device that exposes application programming interfaces (APIs) to communicate with one or more connected image capturing devices such as physical scanners, to discover properties of the image capturing devices and to instruct the image capturing devices to perform their native functions and acquire images from the image capturing devices.

The scanner redirection method according to one embodiment includes the steps of: receiving from an application running on the host server, a request for scanner properties; acquiring from the image capture core properties of the physical scanner; converting with the conversion module, the properties of the physical scanner that are described according to a first scanning protocol to properties of the physical scanner that are described according to a second scanning protocol; transmitting the properties of the physical scanner that are described according to the second scanning protocol to the application; in response to detecting a user selection made on an image of a user interface that shows the transmitted properties of the physical scanner, transmitting the user selection to the application; and in response to the user selection, receiving from the application, a request for a scanned image, and transmitting a request to the image capture core to acquire the scanned image from the physical scanner.

Further embodiments include a non-transitory computer-readable storage medium comprising instructions that cause a remote desktop system to carry out the above method, as well as a remote desktop system configured to carry out the above method.

DETAILED DESCRIPTION

Techniques for realizing scanner redirection between a client computing device and a host server during a remote session are described. A guest operating system (OS) in a virtual machine (VM) of the host server executes an application that requires one or more images to be scanned by a physical scanner that is connected to the client computing device. Accordingly, the application in the VM of the host server requests the image(s) from a module of a remote desktop (RD) client application, referred to as a "scanner redirection module." The scanner redirection module acquires the image(s) from the physical scanner and transmits the image(s) to the application in the VM of the host server. Additionally, before transmitting the image(s) to the application in the VM of the host server, the scanner redirection module of the RD client application performs various processing. For example, the scanner redirection module may add a watermark to the image(s), which is a picture or pattern that is visible when held against light. The scanner redirection module may also compress the image(s) to reduce the bandwidth consumption of the transmission thereof to the application in the VM of the host server.

The client computing device and host server run different OSs. As a result, to realize the described scanner redirection, the scanner redirection module and the application in the VM of the host server utilize robust but different scanning protocols such as the Image Capture (ICA) framework and the TWAIN protocol. Pursuant to its scanning protocol, the application in the VM of the host server utilizes a "data source manager" and a "virtual data source." The data source manager communicates with the virtual data source, which requests scanned images from the scanner redirection module. Pursuant to the other scanning protocol, the scanner redirection module utilizes an "image capture core" that is configured to communicate with the physical scanner to acquire scanned images for transmitting to the application in the VM of the host server.

Because the scanner redirection module and the application in the VM of the host server utilize different scanning protocols, requests from the application in the VM of the host server and responses from the scanner redirection module are described according to different scanning protocols. Accordingly, the scanner redirection module includes a conversion module. The conversion module converts requests from the application in the VM of the host server to the scanning protocol utilized by the scanner redirection module. The conversion module also converts responses from the image capture core to the scanning protocol utilized by the application in the VM of the host server before transmitting the responses to the application in the VM of the host server. These and further aspects of the invention are discussed below with respect to the drawings.

Figure 1:
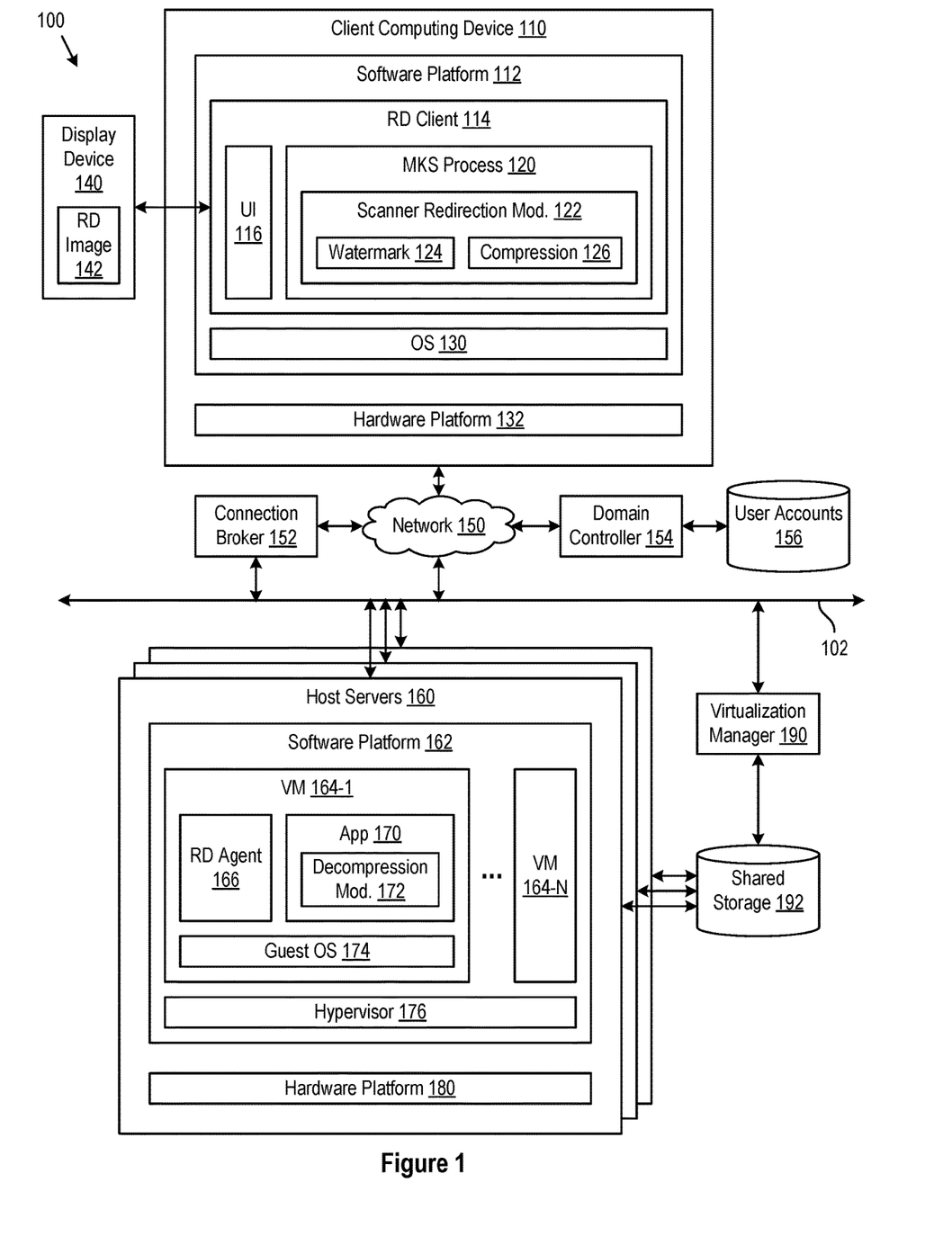
FIG. 1 is a block diagram of a virtualized desktop infrastructure system in which embodiments may be implemented.

FIG. 1 is a block diagram of a virtualized desktop infrastructure (VDI) system 100 (also referred to as an RD computer system) in which scanning according to embodiments may be implemented. VDI system 100 includes a client computing device 110 and a plurality of host servers 160 that are remote from client computing device 110, e.g., in a remote data center. Client computing device 110 is constructed on a hardware platform 132 such as an x86 architecture platform. Hardware platform 132 includes conventional components (not shown) of a computing device, such as one or more central processing units (CPUs), memory such as random-access memory (RAM), local storage such as one or more magnetic drives or solid-state drives (SSDs), and one or more network interface cards (NICs). The CPU(s) are configured to execute instructions such as executable instructions that perform one or more operations described herein, which may be stored in the memory. The NIC(s) enable client computing device 110 to communicate with host servers 160 over a physical network 150 such as the Internet.

Client computing device 110 includes a software platform 112 on which an RD client software program 114 runs on an OS 130, which is a commodity OS. The term "desktop" refers to the instance of an interactive operating environment provided by an OS and software applications, typically in the form of display and sound output and keyboard and mouse input. With RD client 114, a user accesses an RD that is running in a remote data center, from any location. For example, RD client 114 may be VMware Horizon® client, available from VMware, Inc., or a special purpose thin client such as those available from Dell, HP, NEC, Sun Microsystems, and Wyse.

One of host servers 160 transmits an image 142 of an RD to a mouse, keyboard, screen (MKS) process 120 of RD client 114. RD client 114 then communicates with a display device 140 such as a monitor on which the user views RD image 142. Additionally, RD client 114 includes a user interface (UI) 116 through which the user adjusts settings such as whether to add watermarks to scanned images, whether to compress scanned images, and which compression methods to use. RD client 114 then transmits the user's selections to scanner redirection module 122. It should be noted that the user may also adjust settings such as the above watermark and compression settings via UIs implemented in host servers 160, e.g., in tray applications therein.

When the user performs actions in the RD such as clicking a mouse or typing on a keyboard, the user's actions are transmitted to MKS process 120. MKS process 120 transmits the user's actions to host server 160 to update the user's RD accordingly. MKS process 120 also includes a scanner redirection module 122 that acquires scanned images from one or more physical scanners (not shown) connected to client computing device 110. The user selects among the physical scanners via UI 116, and RD client 114 transmits identifications of the selected scanners to scanner redirection module 122. Scanner redirection module 122 transmits such scanned images to host server 160. Scanner redirection module 122 includes a watermark module 124 for adding watermarks to scanned images and a compression module 126 for compressing scanned images before transmitting the scanned images to host server 160. For example, the physical scanners may scan images in Bitmap (BMP) format, and compression module 126 may convert the scanned images into Joint Photographic Experts Group (JPG) format or Portable Network Graphic (PNG) format. Scanner redirection module 122 is discussed further below in conjunction with FIG. 2.

VDI system 100 includes a domain controller 154 such as Microsoft Active Directory® that manages user accounts 156 including the user's log-in information for the RD. VDI system 100 also includes a connection broker 152 that manages connections between RD client 114 and a host server running the user's RD. Connection broker 152 and domain controller 154 may run on separate servers or in separate VMs running on the same server or different servers.

In embodiments illustrated herein, RDs are running in VMs 164. VMs 164 are instantiated on a plurality of host servers 160, each of which includes a software platform 162 and a hardware platform 180. Hardware platform 180 is, e.g., a server-grade x86 architecture platform including the conventional components of a computing device described above for hardware platform 132. Software platform 162 includes a hypervisor 176, which is a virtualization software layer that supports a VM execution space within which VMs 164 are concurrently instantiated and executed. One example of hypervisor 176 is a VMware ESX® hypervisor, available from VMware, Inc.

Each of host servers 160 is controlled by a virtualization manager 190, and hardware platform 180 of each of host servers 160 is coupled to a shared persistent storage system 192. Virtualization manager 190 logically groups host servers 160 into a cluster to perform cluster-level tasks such as provisioning and managing VMs 164 and migrating VMs 164 from one of host servers 160 to another. Virtualization manager 190 communicates with host servers 160 via a management network (not shown) provisioned from a physical network 102 such as a local area network (LAN) of a remote data center. Virtualization manager 190 may be, e.g., a physical server or one of VMs 164. One example of virtualization manager 190 is VMware vCenter Server,® available from VMware, Inc.

VM 164-1 includes an RD agent software program 166 and an application 170 running on a guest OS 174, which is a commodity OS that is different from OS 130. RD agent 166 communicates with RD client 114 to establish a session for the user's RD. RD image 142 is generated in VM 164-1 and transmitted by RD agent 166 to RD client 114 via MKS process 120 to be displayed on display device 140. Application 170 requires images to be scanned by the physical scanner(s) connected to client computing device 110. Application 170 has been modified to handle scanner redirection with scanner redirection module 122. In one example, application 170 is Adobe Photoshop, which the user is accessing through the RD session. Application 170 includes a decompression module 172 for decompressing scanned images received from client computing device 110. Application 170 is discussed further below in conjunction with FIG. 2. A particular configuration of VDI system 100 is illustrated in FIG. 1, but it should be recognized that one or more embodiments may be practiced with other computer system configurations.

Figure 2:
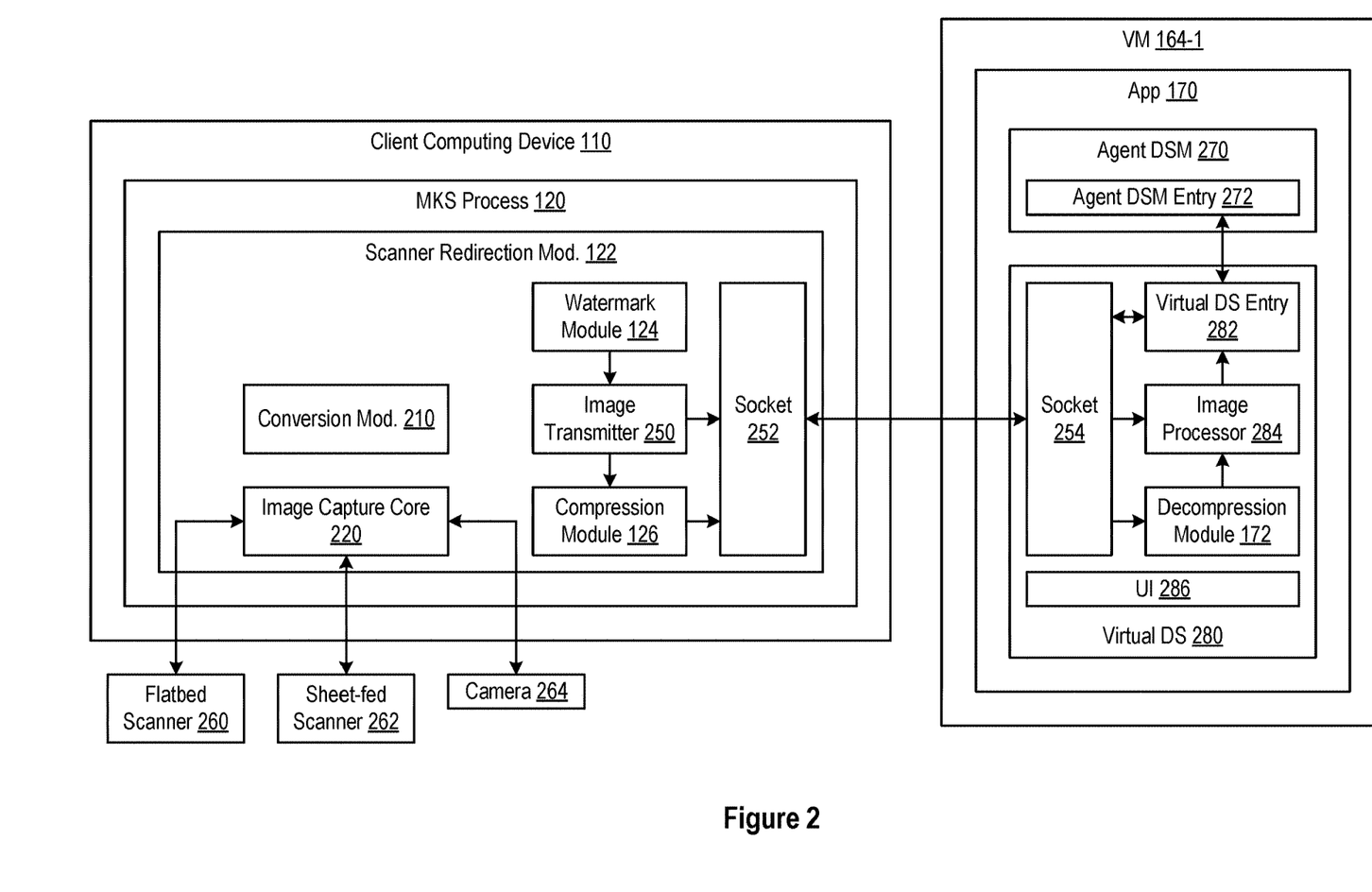
FIG. 2 is a block diagram of a client computing device and a virtual machine running on a host server, of the virtualized desktop infrastructure system.

FIG. 2 is a block diagram illustrating client computing device 110 and VM 164-1 of VDI system 100. Client computing device 110 is connected to three physical scanners: a flatbed scanner 260, a sheet-fed scanner 262, and a camera 264. Scanner redirection module includes a conversion module 210 that converts the properties between being described according to the scanning protocol of scanner redirection module 122 and being described according to the scanning protocol of application 170, as discussed further below in conjunction with FIG. 7. Scanner redirection module 122 of client computing device 110 includes an image capture core 220 that communicates with flatbed scanner 260, sheet-fed scanner 262, and camera 264 to acquire scanned images therefrom. Although illustrated as communicating directly with the physical scanners, image capture core 220 may also communicate with separate drivers in OS 130 to acquire scanned images from the physical scanners.

After image capture core 220 acquires a scanned image from a physical scanner, scanner redirection module 122 transmits the scanned image to an image transmitter 250. However, if the user has selected for the scanned image to include a watermark, scanner redirection module 122 transmits the scanned image to watermark module 124 to add the watermark before the scanned image is transmitted to image transmitter 250. Furthermore, if the user has selected for the scanned image to be compressed, image transmitter 250 transmits the scanned image to compression module 126 for compression, which may be either lossy or lossless. Finally, the scanned image is transmitted to application 170 of VM 164-1 via sockets 252 and 254 of scanner redirection module 122 and application 170, respectively. To perform the communication between scanner redirection module 122 and individual components thereof and between individual components thereof, calls are made via APIs defined by scanner redirection module 122, conversion module 210, image capture core 220, watermark module 124, compression module 126, and image transmitter 250.

Application 170 includes an agent DSM 270 that communicates with a virtual DS 280 to request scanned images. Virtual DS 280 is configured to communicate with scanner redirection module 122 to acquire scanned images from the physical scanners. Application 170 calls an "agent DSM entry" function 272 to transmit commands to agent DSM 270. Agent DSM 270 calls a "virtual DS entry" function 282 to transmit commands to virtual DS 280. Virtual DS 280 also returns results to agent DSM 270 via return values of virtual DS entry 282 calls. Similarly, agent DSM 270 provides results via return values of agent DSM entry 272 calls. Virtual DS 280 has a UI 286 for allowing the user to adjust scanner properties of physical scanners and to begin scanning images.

As previously mentioned, application 170 receives scanned images from scanner redirection module 122 via sockets 252 and 254. Specifically, the scanned images are received by an image processor 284 of virtual DS 280 that renders the scanned images, e.g., rotating upside-down images so that they face right-side-up. Furthermore, if the scanned images were compressed by compression module 126, the scanned images are passed to decompression module 172 to be decompressed. Image processor 284 returns scanned images to virtual DS 280, which returns the scanned images to agent DSM 270. It should be noted that although FIGS. 1 and 2 illustrate watermark module 124 in scanner redirection module 122, watermark module 124 could instead be added to application 170. For example, decompression module 172 could transmit a decompressed image to watermark module 124, at which point watermark module 124 adds a watermark to the image and transmits the image to image processor 284.

Figure 3:
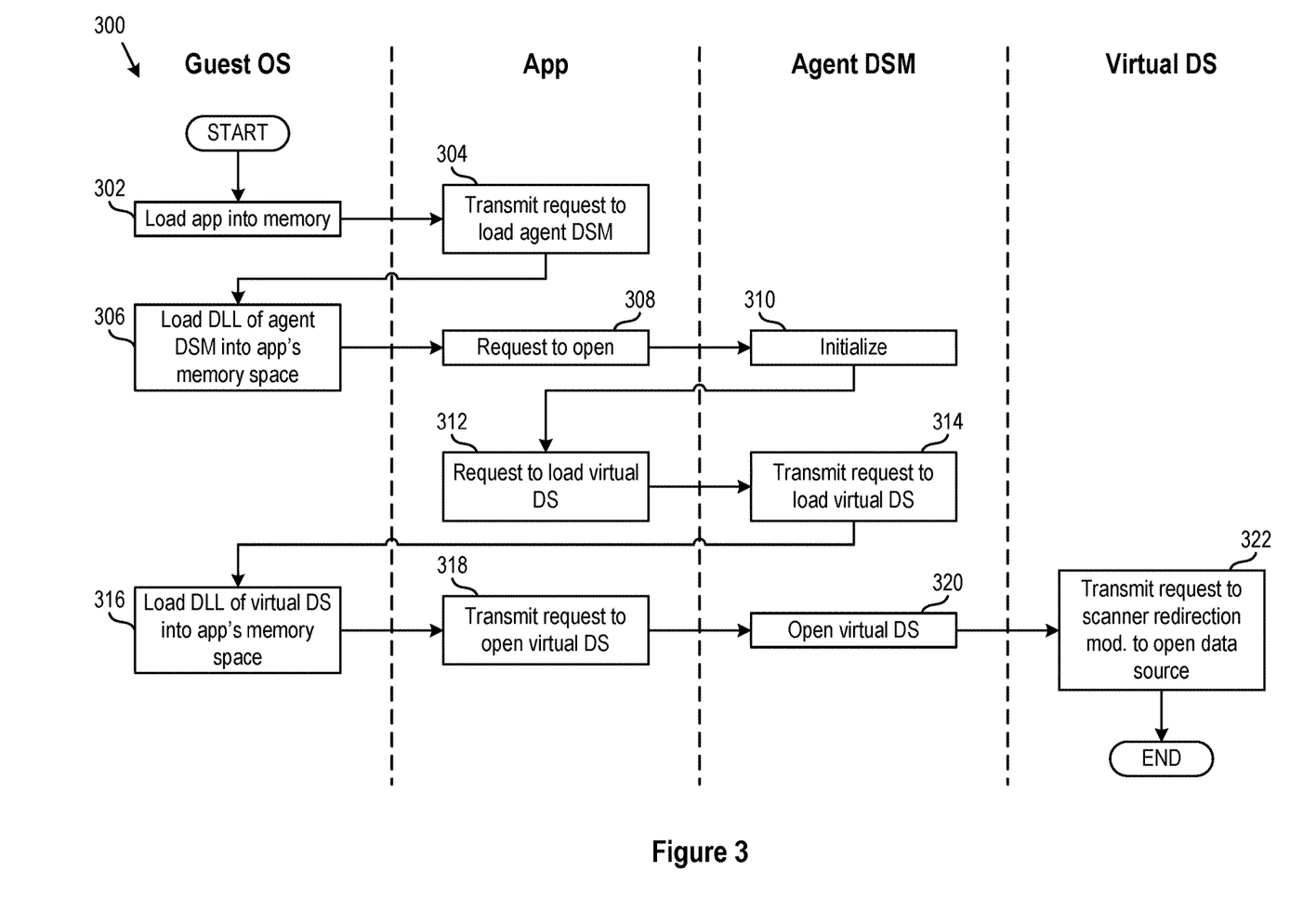
FIG. 3 is a flow diagram of steps performed by a guest operating system and application of the virtual machine to carry out a method of loading and opening a data source manager and data source of the application, according to an embodiment.

FIG. 3 is a flow diagram of steps performed by guest OS 174 and application 170 of VM 164-1 to carry out a method 300 of loading and opening agent DSM 270 and virtual DS 280, according to an embodiment. At step 302, guest OS 174 loads application 170 from shared storage 192 into memory of hardware platform 180. At step 304, application 170 transmits a request to guest OS 174 to load agent DSM 270. At step 306, guest OS 174 loads a dynamic link library (DLL) of agent DSM 270 from shared storage 192 into memory of hardware platform 180, specifically into the memory space into which application 170 was loaded at step 302.

At step 308, application 170 calls agent DSM entry 272 to request agent DSM 270 to open. At step 310, agent DSM 270 initializes, at which point agent DSM 270 is available to assist application 170 in opening virtual DS 280. Agent DSM 270 thus transmits a return value of agent DSM entry 272 to application 170, indicating that agent DSM 270 is open. At step 312, application 170 calls agent DSM entry 272 to request agent DSM 270 to load virtual DS 280. At step 314, agent DSM 270 transmits a request to guest OS 174 to load virtual DS 280.

At step 316, guest OS 174 loads a DLL of virtual DS 280 from shared storage 192 into memory of hardware platform 180, specifically into the memory space into which application 170 was loaded at step 302. At step 318, application 170 calls agent DSM entry 272 to transmit a request to agent DSM 270 to open virtual DS 280. At step 320, agent DSM 270 opens virtual DS 280, at which point virtual DS 280 is available to assist agent DSM 270 in transmitting commands to scanner redirection module 122. At step 322, virtual DS 280 transmits a request to scanner redirection module 122 via sockets 252 and 254 to open a data source of scanner redirection module 122. After step 322, method 300 ends.

Figure 4:
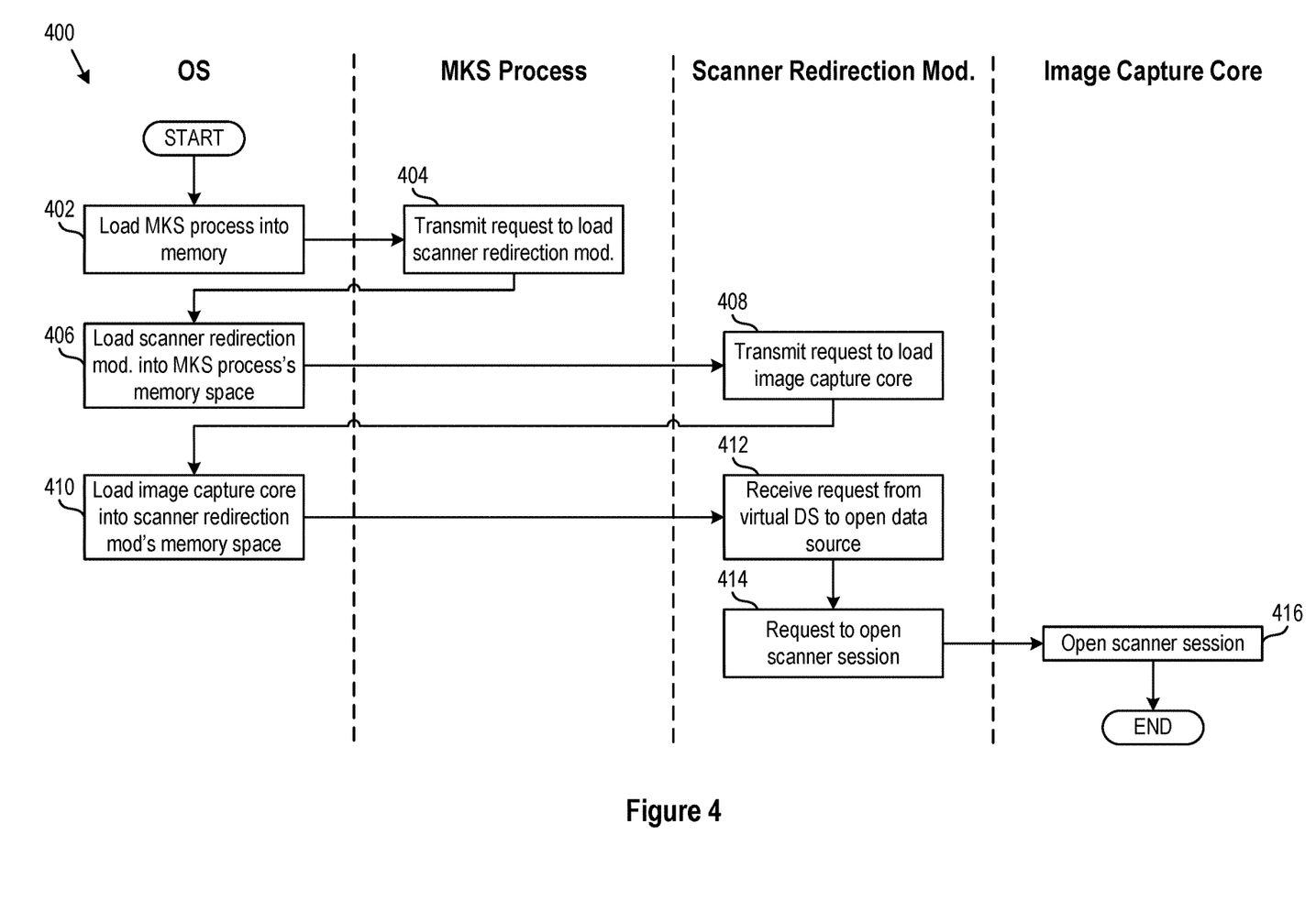
FIG. 4 is a flow diagram of steps performed by an operating system and remote desktop client application of the client computing device to carry out a method of loading and opening a physical scanner, according to an embodiment.

FIG. 4 is a flow diagram of steps performed by OS 130 and MKS process 120 of client computing device 110 to carry out a method 400 of loading and opening a physical scanner, according to an embodiment. For example, method 400 will be discussed with respect to flatbed scanner 260. At step 402, OS 130 loads MKS process 120 from storage of hardware platform 132 into memory of hardware platform 132. At step 404, MKS process 120 transmits a request to OS 130 to load scanner redirection module 122.

At step 406, OS 130 loads scanner redirection module 122 from storage of hardware platform 132 into memory of hardware platform 132, specifically into the memory space into which MKS process 120 was loaded at step 402. At step 408, scanner redirection module 122 transmits a request to OS 130 to load image capture core 220. At step 410, OS 130 loads image capture core 220 from storage of hardware platform 132 into memory of hardware platform 132, specifically into the memory space into which scanner redirection module 122 was loaded at step 406. At step 412, scanner redirection module 122 receives a request from virtual DS 280 to open a data source of application 170.

At step 414, scanner redirection module 122 makes an API call to image capture core 220 to request image capture core 220 to open a session with flatbed scanner 260. At step 416, image capture core 220 opens a session with flatbed scanner 260, at which point image capture core 220 can determine properties of flatbed scanner 260 and acquire images therefrom. After step 416, method 400 ends. Steps 414 to 416 may be repeated for opening sessions with other physical scanners connected to client computing device 110 such as sheet-fed scanner 262 and camera 264.

Figure 5:
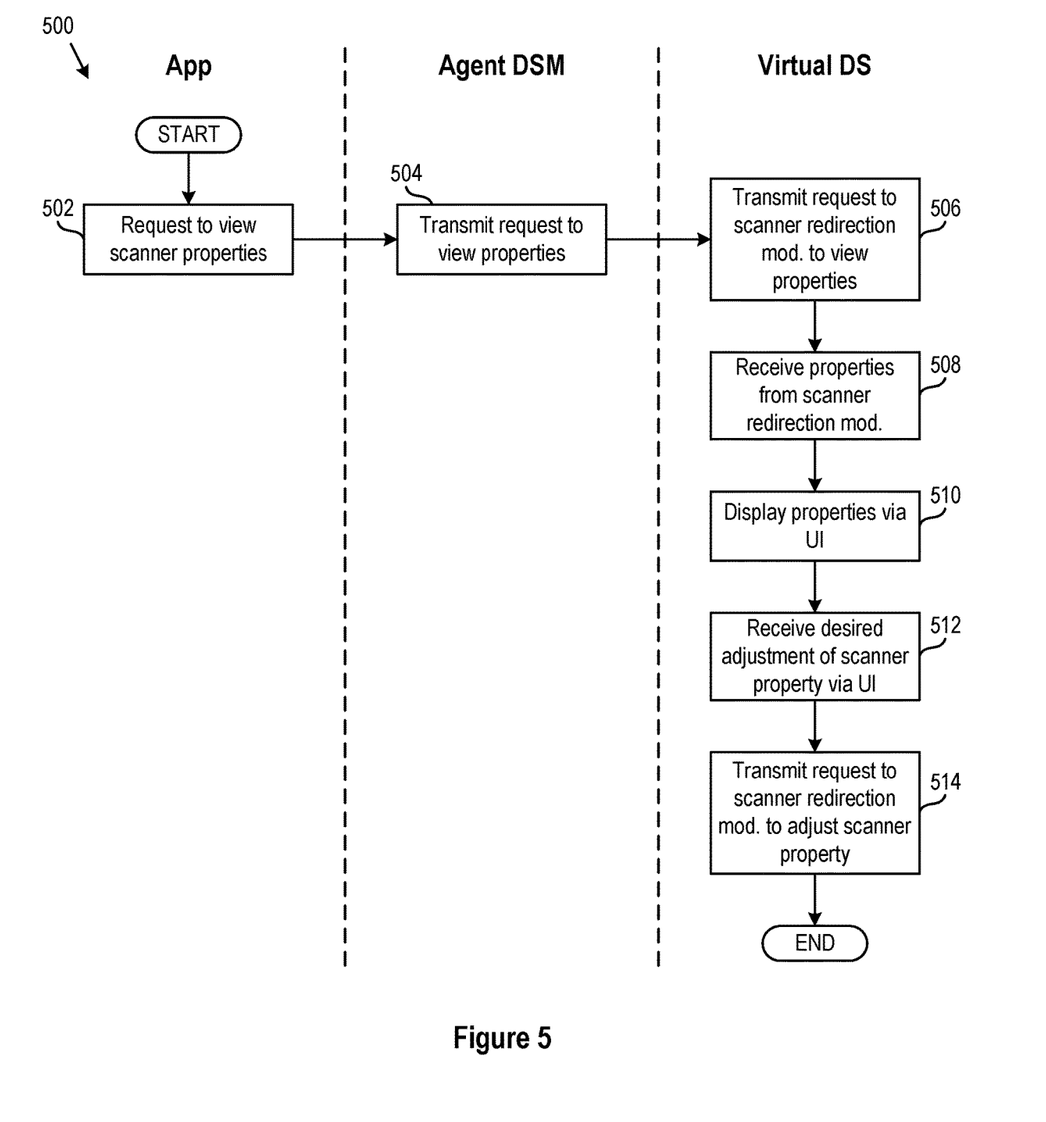
FIG. 5 is a flow diagram of steps performed by the application of the virtual machine to carry out a method of transmitting a request to a scanner redirection module of the client computing device to adjust a property of the physical scanner, according to an embodiment.

FIG. 5 is a flow diagram of steps performed by application 170 of VM 164-1 to carry out a method 500 of transmitting a request to scanner redirection module 122 to adjust a scanner property, according to an embodiment. Method 500 along with methods of FIGS. 6-10 are performed after agent DSM 270 and virtual DS 280 are loaded into memory and initialized according to method 300 of FIG. 3 and scanner redirection module 220 is loaded into memory according to method 400 of FIG. 4.

At step 502, application 170 calls agent DSM entry 272 to request agent DSM 270 to view scanner properties. A step 504, agent DSM 270 makes a virtual DS entry 282 call to transmit a request to virtual DS 280 to view the properties. At step 506, virtual DS 280 transmits a request to scanner redirection module 122 via sockets 252 and 254 to view the properties. At step 508, virtual DS 280 receives the properties from scanner redirection module 122 via sockets 252 and 254. For example, the properties may indicate possible resolutions for scanned images and being able to scan in simplex or duplex, and grey or color mode.

At step 510, virtual DS 280 displays the received properties via UI 286, which the user sees via display device 140. At step 512, virtual DS 280 receives input from the user via UI 286, indicating a desired adjustment of a scanner property. For example, the input may indicate a desired resolution for scanned images, scanning in simplex or duplex, scanning in grey mode or color mode, etc. Steps 510 and 512 are discussed further below in conjunction with FIG. 6. At step 514, virtual DS 280 transmits a request to scanner redirection module 122 to adjust the scanner property. After step 514, method 500 ends.

Figure 6:
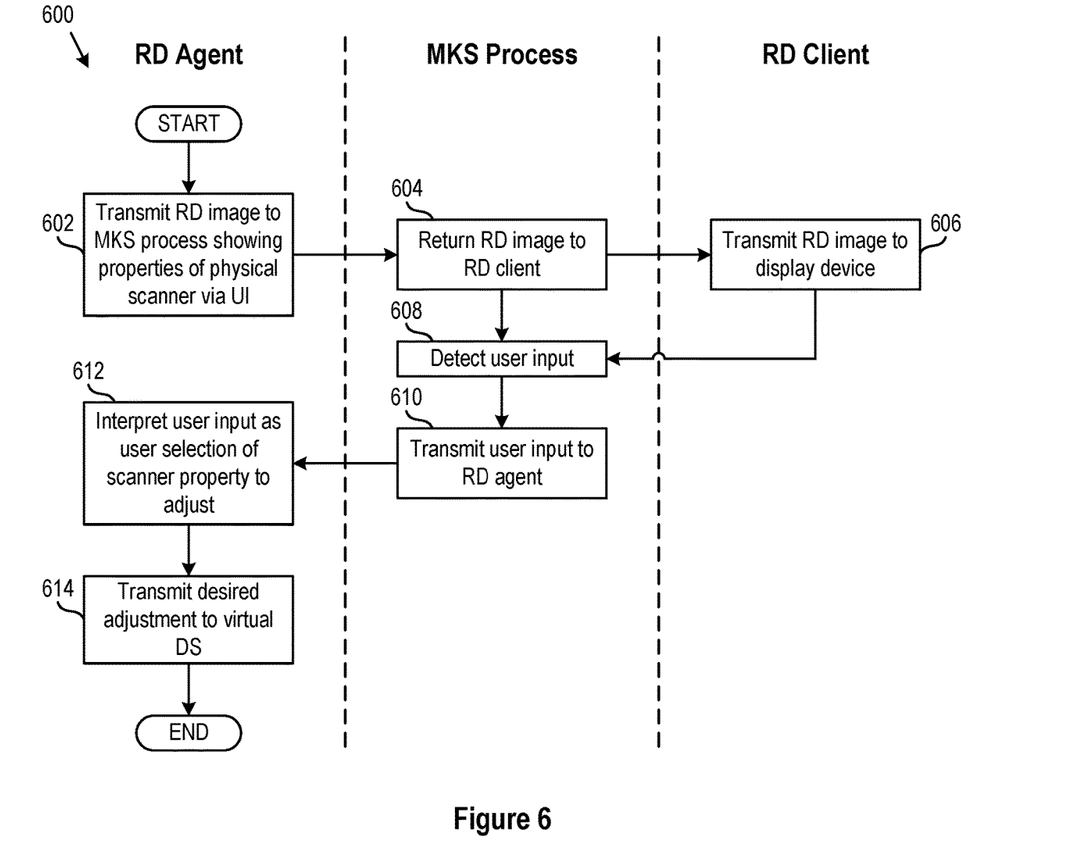
FIG. 6 is a flow diagram of steps performed by remote desktop software of the client computing device and the host server to carry out a method of displaying an image of a remote desktop to a user of the remote desktop through which the user selects the scanner property of the physical scanner to adjust, according to an embodiment.

FIG. 6 is a flow diagram of steps performed by RD software of client computing device 110 and host server 160 to carry out a method 600 of displaying RD image 142 through which the user selects a scanner property of a physical scanner to adjust, according to an embodiment. For example, FIG. 6 will be discussed with respect to flatbed scanner 260. Before method 600, the user selects to view scanner properties, and the RD is accordingly updated to include properties of flatbed scanner 260 via UI 286 of application 170.

At step 602, RD agent 166 of host server 160 transmits RD image 142 to MKS process 120. RD image 142 illustrates the properties of flatbed scanner 260. At step 604, MKS process 120 returns RD image 142 to RD client 114. At step 606, RD client 114 transmits RD image 142 to display device 140 to be displayed to the user. At step 608, MKS process 120 detects user input, e.g., a clicking of a mouse or typing on a keyboard. At step 610, MKS process 120 transmits the user input to RD agent 166. At step 612, RD agent 166 interprets the user input as a user selection of a scanner property to adjust. At step 614, RD agent 166 transmits the desired adjustment to virtual DS 280. After step 614, method 600 ends.

Figure 7:
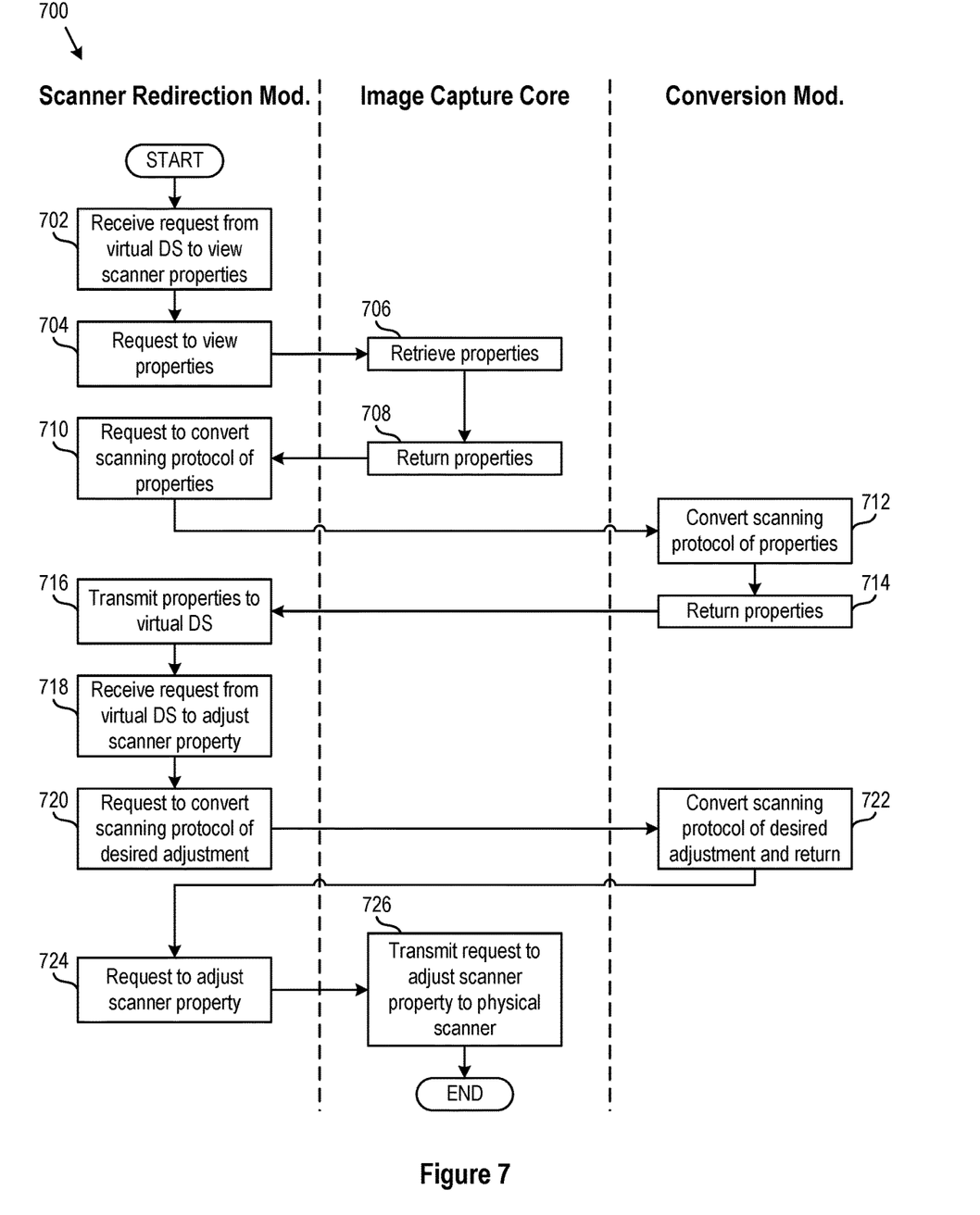
FIG. 7 is a flow diagram of steps performed by the scanner redirection module of the client computing device to carry out a method of adjusting the scanner property, according to an embodiment.

FIG. 7 is a flow diagram of steps performed by scanner redirection module 122 of client computing device 110 to carry out a method 700 of adjusting a scanner property, according to an embodiment. At step 702, scanner redirection module 122 receives a request from virtual DS 280 via sockets 252 and 254 to view properties of a physical scanner, which the user previously designated via UI 116, scanner redirection module 122 having then received an identification of a physical scanner from RD client 114. For example, method 700 will be discussed with reference to flatbed scanner 260.

At step 704, scanner redirection module 122 makes an API call to image capture core 220 to request image capture core 220 to view properties of flatbed scanner 260. At step 706, image capture core 220 retrieves a list of properties from flatbed scanner 260. For example, the properties may indicate possible resolutions for scanned images and being able to scan in simplex or duplex, and grey or color mode. The properties are described according to the scanning protocol of scanner redirection module 122. At step 708, image capture core 220 returns the properties to scanner redirection module 122.

At step 710, scanner redirection module 122 makes an API call to conversion module 210 to request conversion module 210 to convert the properties from being described according to the scanning protocol of scanner redirection module 122 to being described according to the scanning protocol of application 170. At step 712, conversion module 210 converts the properties to be described according to the scanning protocol of application 170. For example, if the scanning protocol of application 170 is TWAIN, conversion module 210 converts the properties to TWAIN capabilities. At step 714, conversion module 210 returns the converted properties to scanner redirection module 122. At step 716, scanner redirection module 122 transmits the properties to virtual DS 280 via sockets 252 and 254. At step 718, scanner redirection module 122 receives a request from virtual DS 280 to adjust a scanner property. The desired adjustment is described according to the scanning protocol of application 170.

At step 720, scanner redirection module 122 makes an API call to conversion module 210 to request conversion module 210 to convert the desired adjustment from being described according to the scanning protocol of application 170 to being described according to the scanning protocol of scanner redirection module 122. At step 722, conversion module 210 converts the desired adjustment to be described according to the scanning protocol of scanner redirection module 122 and returns the converted adjustment to scanner redirection module 122. For example, if the scanning protocol of scanner redirection module 122 is the ICA framework, conversion module 210 converts the desired adjustment of a scanner property to a property of flatbed scanner 260 described according to the ICA framework. At step 724, scanner redirection module 122 makes an API call to image capture core 220 to request image capture core 220 to adjust the scanner property.

At step 726, image capture core 220 transmits a request to flatbed scanner 260 to adjust the scanner property. After step 726, method 700 ends. Scanner redirection module 122 may receive additional requests to adjust scanner properties, at which points steps 720-726 are repeated for the additional requests. On the other hand, although illustrated as step 716 moving to step 718, if scanner redirection module 122 does not receive any requests to adjust scanner properties, method 700 ends after step 716.

Figure 8:
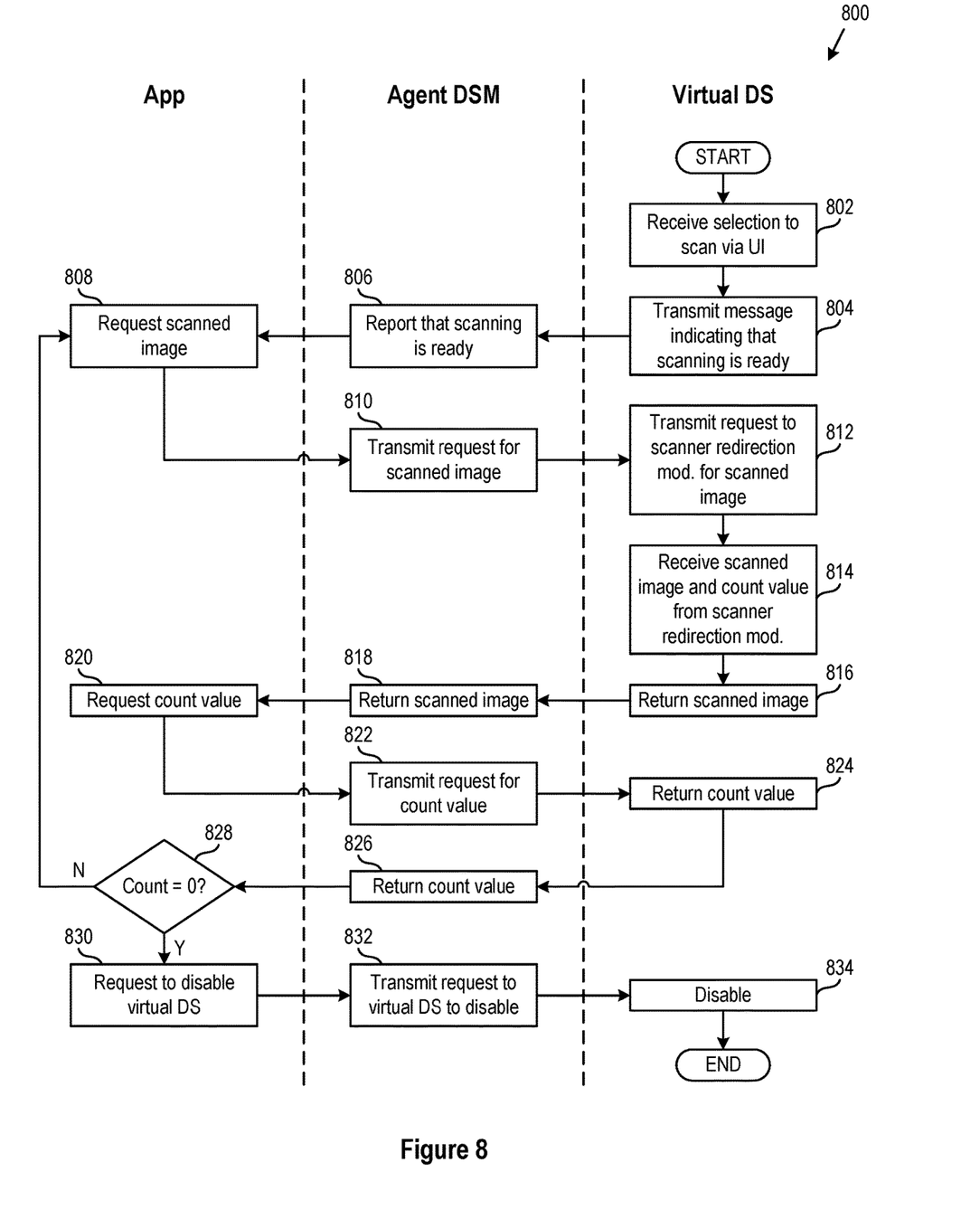
FIG. 8 is a flow diagram of steps performed by the application of the virtual machine to carry out a method of acquiring one or more scanned images from the scanner redirection module of the client computing device, according to an embodiment.

FIG. 8 is a flow diagram of steps performed by application 170 of VM 164-1 to carry out a method 800 of acquiring one or more scanned images from scanner redirection module 122 of client computing device 110, according to an embodiment. At step 802, virtual DS 280 receives a selection via UI 286 to scan an image. At step 804, virtual DS 280 transmits a message to agent DSM 270 indicating that scanning is ready. At step 806, agent DSM 270 reports to application 170 that scanning is ready.

At step 808, application 170 calls agent DSM entry 272 to request a scanned image from agent DSM 270. At step 810, agent DSM 270 calls virtual DS entry 282 to transmit a request to virtual DS 280 for the scanned image. At step 812, virtual DS 280 transmits a request for the scanned image to scanner redirection module 122 via sockets 252 and 254. At step 814, virtual DS 280 receives the scanned image and a "count" value from scanner redirection module 122 via sockets 252 and 254. Count is a variable indicating whether there are any pending scanned images yet to be retrieved from a physical scanner. A count value of zero indicates that there are no pending scanned images, while a nonzero count value indicates that there is at least one pending scanned image.

At step 816, virtual DS 280 transmits the scanned image to agent DSM 270 as a return value of the call to virtual DS entry 282 at step 810. Virtual DS 280 also stores the count value in memory of hardware platform 180 for later. At step 818, agent DSM 270 returns the scanned image as a return value of the call to agent DSM entry 272 at step 808. At step 820, application 170 calls agent DSM entry 272 to request agent DSM 270 for the count value. At step 822, agent DSM 270 calls virtual DS entry 282 to transmit a request to virtual DS 280 for the count value. At step 824, virtual DS 280 retrieves the count value from memory and transmits the count value to agent DSM 270 as a return value of the call to virtual DS entry 282 at step 822. At step 826, agent DSM 270 reports the count value as a return value of the call to agent DSM entry 272 at step 820.

At step 828, application 170 checks if the count value is zero. If the count value is nonzero, method 800 returns to step 808, and application 170 calls agent DSM entry 272 to request another scanned image from agent DSM 270. Otherwise, if the count value is zero, method 800 moves to step 830. At step 830, application 170 calls agent DSM entry 272 to request agent DSM 270 to disable virtual DS 280. At step 832, agent DSM 270 calls virtual DS entry 282 to transmit a request to virtual DS 280 to disable. At step 834, virtual DS 280 disables itself such that it is no longer available to assist agent DSM 270 in transmitting commands to scanner redirection module 122 via sockets 252 and 254. After step 834, method 800 ends.

Figure 9:
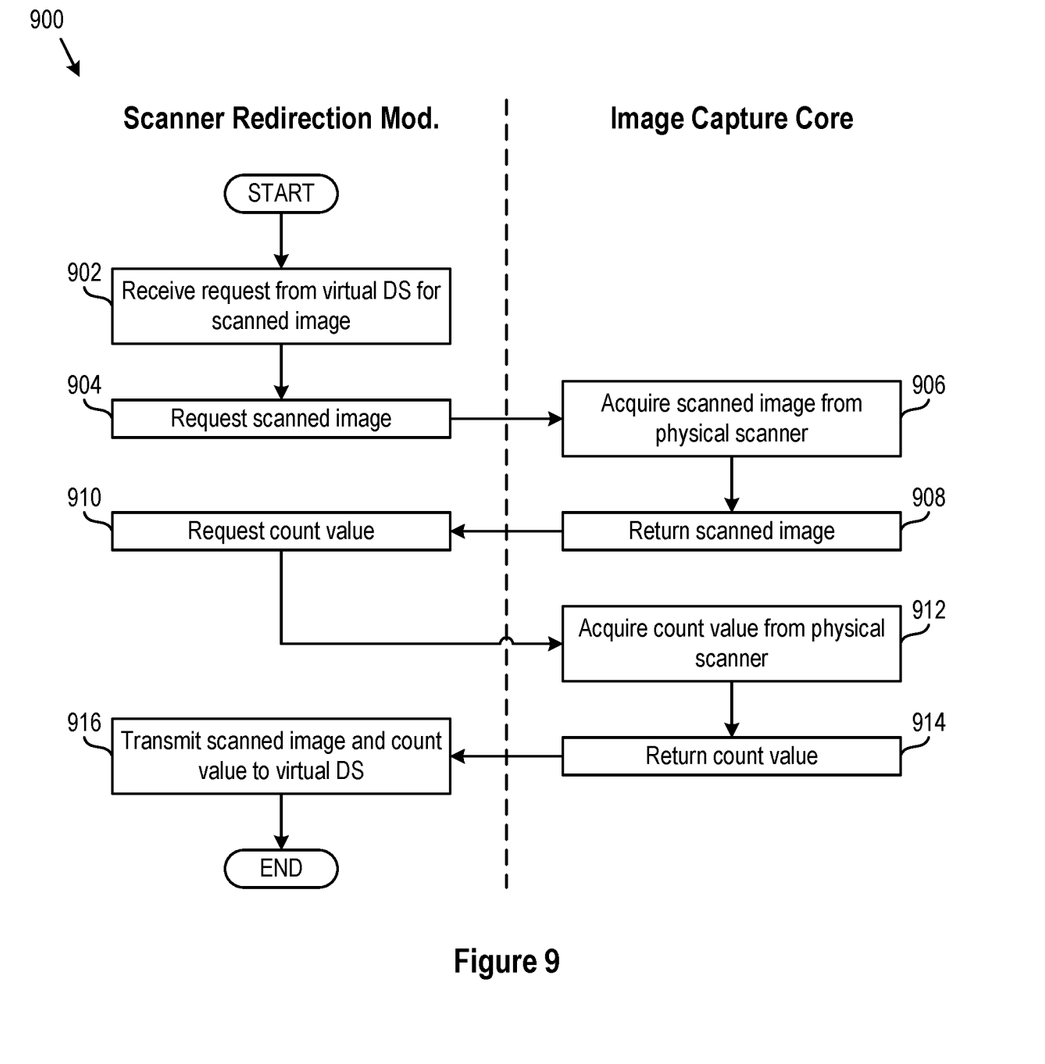
FIG. 9 is a flow diagram of steps performed by the scanner redirection module of the client computing device to carry out a method of acquiring one or more scanned images from the physical scanner, according to an embodiment.

FIG. 9 is a flow diagram of steps performed by scanner redirection module 122 of client computing device 110 to carry out a method 900 of acquiring one or more scanned images from a physical scanner, according to an embodiment. For example, method 900 will be discussed with respect to sheet-fed scanner 262. At step 902, scanner redirection module 122 receives a request for a scanned image from virtual DS 280 via sockets 252 and 254. At step 904, scanner redirection module 122 makes an API call to image capture core 220 to request image capture core 220 for the scanned image. At step 906, image capture core 220 acquires the scanned image from sheet-fed scanner 262, which the user previously designated via UI 116, scanner redirection module 122 having then received an identification of sheet-fed scanner 262 from RD client 114.

At step 908, image capture core 220 returns the scanned image to scanner redirection module 122. At step 910, scanner redirection module 122 makes an API call to image capture core 220 to request image capture core 220 for a count value. At step 912, image capture core 220 acquires the count value from sheet-fed scanner 262. At step 914, image capture core 220 returns the count value to scanner redirection module 122. At step 916, scanner redirection module 122 transmits the scanned image and count value to virtual DS 280 via sockets 252 and 254. After step 916, method 900 ends. It should be noted that image capture core 220 acquires images from sheet-fed scanner 262 asynchronously. Accordingly, if sheet-fed scanner 262 scans multiple images, image capture core 220 performs steps 906 and 908 to acquire and return multiple scanned images asynchronously.

Figure 10:
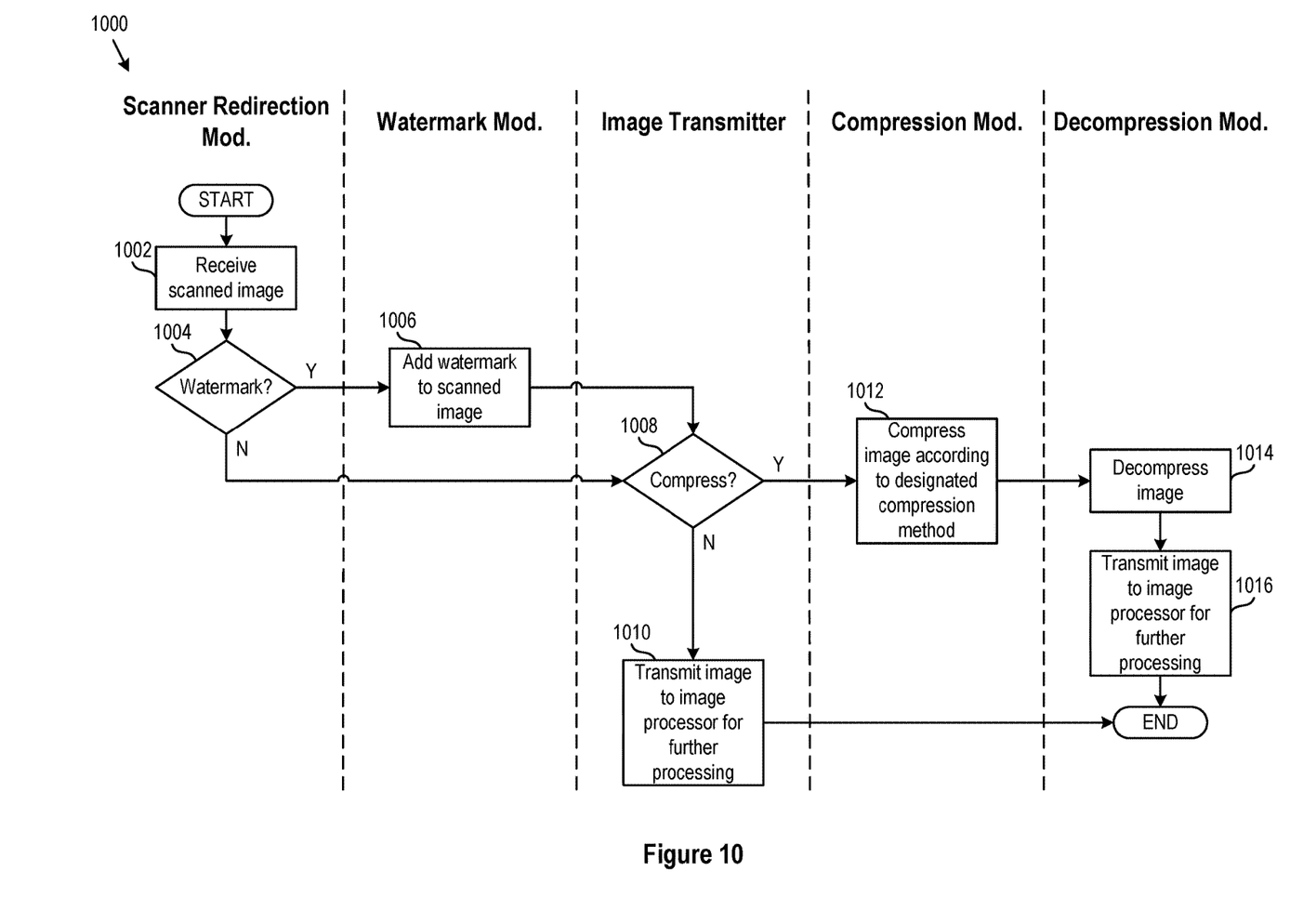
FIG. 10 is a flow diagram of steps performed by the scanner redirection module of the client computing device and the application of the virtual machine to carry out a method of adding a watermark to a scanned image and compressing and decompressing the scanned image, according to an embodiment.

FIG. 10 is a flow diagram of steps performed by scanner redirection module 122 of client computing device 110 and application 170 of VM 164-1 to carry out a method 1000 of adding a watermark to a scanned image and compressing and decompressing a scanned image, according to an embodiment. At step 1002, scanner redirection module 122 receives a scanned image as a return value of a call to client DSM entry 212. At step 1004, scanner redirection module 122 determines whether to add a watermark to the scanned image, which the user previously designated via UI 116, scanner redirection module 122 having then received an indication of the user's selection from RD client 114.

If the user did not designate to add a watermark, scanner redirection module 122 provides the scanned image to image transmitter 250, and method 1000 moves to step 1008. Otherwise, if the user did designate to add a watermark, scanner redirection module 122 provides the scanned image to watermark module 124, and method 1000 moves to step 1006. At step 1006, watermark module 124 adds a watermark to the scanned image and transmits the scanned image with the added watermark to image transmitter 250.

At step 1008, image transmitter 250 determines whether to compress the scanned image and if so, which compression method to use, both of which the user previously designated via UI 116, scanner redirection module 122 having then received an indication of the user's selections from RD client 114. If the user did not designate to compress the scanned image, method 1000 moves to step 1010. At step 1010, image transmitter 250 transmits the scanned image to image processor 284 of application 170 via sockets 252 and 254 for further processing, e.g., rotating the scanned image so that it faces right-side-up. After step 1010, method 1000 ends.

Returning to step 1008, if the user did designate to compress the scanned image, image transmitter 250 transmits the scanned image to compression module 126, and method 1000 moves to step 1012. At step 1012, compression module 126 compresses the scanned image according to the designated compression method. For example, the user may have designated to compress the scanned image into JPG format. After step 1012, compression module 126 transmits the compressed image to decompression module 172 via sockets 252 and 254. At step 1014, decompression module 172 decompresses the scanned image, e.g., converting the scanned image from JPG format into BMP format. At step 1016, decompression module 172 transmits the decompressed image to image processor 284 for further processing. After step 1016, method 1000 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop system that includes a client computing device that has running therein a scanner redirection module, and a host server, the scanner redirection module including a conversion module and including an image capture core that is configured to communicate with a physical scanner, the scanner redirection method comprising:

in response to receiving from an application running on the host server, a request for scanner properties, acquiring from the image capture core, properties of the physical scanner that the image capture core acquired from the physical scanner and that are described according to a first scanning protocol;

converting with the conversion module, the properties of the physical scanner to properties described according to a second scanning protocol, and then transmitting the converted properties of the physical scanner to the application;

after transmitting the converted properties of the physical scanner to the application, in response to receiving from the application, a request to adjust one of the properties of the physical scanner that is described according to the second scanning protocol: converting with the conversion module, the requested adjustment of the property of the physical scanner to an adjustment of the property described according to the first scanning protocol, and then transmitting to the image capture core, a request for the converted adjustment of the property of the physical scanner, in response to which the image capture core requests the physical scanner to adjust the property of the physical scanner;

in response to detecting a user selection made on an image of a user interface that shows the properties of the physical scanner transmitted to the application, transmitting the user selection to the application, in response to which a request is received from the application for a scanned image;

in response to receiving the request for the scanned image from the application, transmitting a request to the image capture core to acquire the scanned image from the physical scanner, in response to which the image capture core acquires the scanned image from the physical scanner having the adjusted property; and upon receiving the scanned image from the image capture core, transmitting the scanned image to the application.

2. The scanner redirection method of claim 1, further comprising:
   determining that a watermark is to be added to the scanned image; and
   before the transmitting of the scanned image to the application, adding the watermark to the scanned image.

3. The scanner redirection method of claim 1, further comprising:
   determining a compression method for compressing the scanned image; and
   before the transmitting of the scanned image to the application, compressing the scanned image according to the determined compression method, wherein the application decompresses the transmitted scanned image.

4. The scanner redirection method of claim 1, further comprising:
   loading the image capture core into a memory space of the scanner redirection module.

5. The scanner redirection method of claim 1, further comprising:
   upon receiving the scanned image from the image capture core, determining that there are no more scanned images available from the physical scanner; and
   based on the determination that there are no more scanned images available, transmitting a message to the application indicating that there are no more scanned images available.

6. The scanner redirection method of claim 1, further comprising:
   upon receiving the scanned image from the image capture core, determining that there is another scanned image available from the physical scanner; and
   based on the determination that there is another scanned image available, transmitting a message to the application indicating the availability of the other scanned image.

7. A non-transitory computer-readable medium comprising instructions that are executable in a remote desktop system that includes a client computing device that has running therein a scanner redirection module, and a host server, the scanner redirection module including a conversion module and including an image capture core that is configured to communicate with a physical scanner, wherein the instructions when executed cause the remote desktop system to carry out a scanner redirection method comprising:
   in response to receiving from an application running on the host server, a request for scanner properties, acquiring from the image capture core, properties of the physical scanner that the image capture core acquired from the physical scanner and that are described according to a first scanning protocol;
   converting with the conversion module, the properties of the physical scanner to properties described according to a second scanning protocol, and then transmitting the converted properties of the physical scanner to the application;
   after transmitting the converted properties of the physical scanner to the application, in response to receiving from the application, a request to adjust one of the properties of the physical scanner that is described according to the second scanning protocol: converting with the conversion module, the requested adjustment of the property of the physical scanner to an adjustment of the property described according to the first scanning protocol, and then transmitting to the image capture core, a request for the converted adjustment of the property of the physical scanner, in response to which the image capture core requests the physical scanner to adjust the property of the physical scanner;
   in response to detecting a user selection made on an image of a user interface that shows the properties of the physical scanner transmitted to the application, transmitting the user selection to the application, in response to which a request is received from the application for a scanned image;
   in response to receiving the request for the scanned image from the application, transmitting a request to the image capture core to acquire the scanned image from the physical scanner, in response to which the image capture core acquires the scanned image from the physical scanner having the adjusted property; and
   upon receiving the scanned image from the image capture core, transmitting the scanned image to the application.

8. The non-transitory computer-readable medium of claim 7, the scanner redirection method further comprising:
   determining that a watermark is to be added to the scanned image; and
   before the transmitting of the scanned image to the application, adding the watermark to the scanned image.

9. The non-transitory computer-readable medium of claim 7, the scanner redirection method further comprising:
   determining a compression method for compressing the scanned image; and
   before the transmitting of the scanned image to the application, compressing the scanned image according to the determined compression method, wherein the application decompresses the transmitted scanned image.

10. The non-transitory computer-readable medium of claim 7, the scanner redirection method further comprising:
    loading the image capture core into a memory space of the scanner redirection module.

11. The non-transitory computer-readable medium of claim 7, the scanner redirection method further comprising:
    upon receiving the scanned image from the image capture core, determining that there are no more scanned images available from the physical scanner; and
    based on the determination that there are no more scanned images available, transmitting a message to the application indicating that there are no more scanned images available.

12. The non-transitory computer-readable medium of claim 7, the scanner redirection method further comprising:
    upon receiving the scanned image from the image capture core, determining that there is another scanned image available from the physical scanner; and
    based on the determination that there is another scanned image available, transmitting a message to the application indicating the availability of the other scanned image.

13. A client computing device of a remote desktop system, the client computing device having running therein a scanner redirection module including a conversion module and including an image capture core that is configured to communicate with a physical scanner, the client computing device being configured to:
    in response to receiving from an application running on a host server, a request for scanner properties, acquire from the image capture core, properties of the physical scanner that the image capture core acquired from the physical scanner and that are described according to a first scanning protocol;

convert with the conversion module, the properties of the physical scanner to properties described according to a second scanning protocol, and then transmit the converted properties of the physical scanner to the application;

after transmitting the converted properties of the physical scanner to the application, in response to receiving from the application, a request to adjust one of the properties of the physical scanner that is described according to the second scanning protocol: convert with the conversion module, the requested adjustment of the property of the physical scanner to an adjustment of the property described according to the first scanning protocol, and then transmit to the image capture core, a request for the converted adjustment of the property of the physical scanner, in response to which the image capture core requests the physical scanner to adjust the property of the physical scanner;

in response to detecting a user selection made on an image of a user interface that shows the properties of the physical scanner transmitted to the application, transmit the user selection to the application, in response to which a request is received from the application for a scanned image;

in response to receiving the request for the scanned image from the application, transmit a request to the image capture core to acquire the scanned image from the physical scanner, in response to which the image capture core acquires the scanned image from the physical scanner having the adjusted property; and upon receiving the scanned image from the image capture core, transmit the scanned image to the application.

14. The client computing device of claim 13, further configured to:
  determine that a watermark is to be added to the scanned image; and
  before the transmitting of the scanned image to the application, add the watermark to the scanned image.

15. The client computing device of claim 13, further configured to:
  determine a compression method for compressing the scanned image; and
  before the transmitting of the scanned image to the application, compress the scanned image according to the determined compression method, wherein the application decompresses the transmitted scanned image.

16. The client computing device of claim 13, further configured to:
  load the image capture core into a memory space of the scanner redirection module.

17. The client computing device of claim 13, further configured to:
  upon receiving the scanned image from the image capture core, determine that there are no more scanned images available from the physical scanner; and
  based on the determination that there are no more scanned images available, transmit a message to the application indicating that there are no more scanned images available.

18. The client computing device of claim 13, further configured to:
  upon receiving the scanned image from the image capture core, determine that there is another scanned image available from the physical scanner; and
  based on the determination that there is another scanned image available, transmit a message to the application indicating the availability of the other scanned image.

* * * * *